(12) United States Patent
Park et al.

(10) Patent No.: US 9,357,207 B2
(45) Date of Patent: May 31, 2016

(54) METHOD AND APPARATUS FOR COMPENSATING FOR TEMPERATURE VARIATIONS OF A LIQUID CRYSTAL DISPLAY PANEL FOR A 3-DIMENSIONAL DISPLAY

(75) Inventors: Sang-moo Park, Uijeongbu-si (KR); Ho-seop Lee, Seongnam-si (KR); Jong-hoon Jung, Suwon-si (KR); Dae-sik Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1039 days.

(21) Appl. No.: 12/912,215

(22) Filed: Oct. 26, 2010

(65) Prior Publication Data

US 2011/0096105 A1 Apr. 28, 2011

(30) Foreign Application Priority Data

Oct. 26, 2009 (KR) .................. 10-2009-0101736

(51) Int. Cl.
*G09G 5/10* (2006.01)
*H04N 13/04* (2006.01)
*G09G 3/36* (2006.01)

(52) U.S. Cl.
CPC ............ *H04N 13/0452* (2013.01); *G09G 3/36* (2013.01); *H04N 13/0497* (2013.01); *G09G 2320/041* (2013.01); *G09G 2320/0626* (2013.01)

(58) Field of Classification Search
CPC ............ G09G 3/36; G09G 2320/041; G09G 2320/0626; H04N 13/0452; H04N 13/0497
USPC ........................................................ 345/690
See application file for complete search history.

(56) References Cited

U.S. PATENT DOCUMENTS

| 6,961,037 | B2 | 11/2005 | Kuwata et al. |
| 8,860,703 | B2 | 10/2014 | Han et al. |
| 2005/0184944 | A1* | 8/2005 | Miyata et al. .................. 345/89 |
| 2009/0009508 | A1* | 1/2009 | Koo .................. H04N 13/0454 345/214 |
| 2010/0053225 | A1* | 3/2010 | Furukawa et al. ............ 345/690 |
| 2010/0128187 | A1* | 5/2010 | Brott et al. ...................... 349/15 |
| 2010/0277519 | A1* | 11/2010 | Lee .............................. 345/690 |
| 2011/0096254 | A1 | 4/2011 | Ikeda |

FOREIGN PATENT DOCUMENTS

| JP | 2004-336226 A | | 11/2004 | |
| KR | 2002-0003277 A | | 1/2002 | |
| KR | 10-2007-0040999 A | | 4/2007 | |
| KR | 20070040999 | * | 4/2007 | .............. G09G 3/36 |
| KR | 10-2007-0052084 A | | 5/2007 | |
| KR | 10-2007-0102932 A | | 10/2007 | |
| KR | 10-2009-0096643 A | | 9/2009 | |
| WO | WO2008/096481 | * | 8/2008 | |

OTHER PUBLICATIONS

Alfred Pool "Feed Foward Makes LCDs Faster", Sep. 24, 2001.*
Communication issued Jul. 13, 2015, issued by the Korean Intellectual Property Office in counterpart Korean Patent Application No. 10-2009-0101736.
Communication dated Dec. 1, 2015, issued by the Korean Intellectual Property Office in Korean Application No. 10-2009-0101736.

* cited by examiner

*Primary Examiner* — Kumar Patel
*Assistant Examiner* — Insa Sadio
(74) *Attorney, Agent, or Firm* — Sughrue Mion, PLLC

(57) ABSTRACT

Methods and apparatuses are provided for compensating for a temperature of a liquid crystal display (LCD) panel. The method includes selecting a lookup table corresponding to a detected temperature of the LCD panel from among lookup tables for a 3-dimensional (3D) display of the LCD panel; and adjusting luminance to be output to the LCD panel based on the selected lookup table.

20 Claims, 4 Drawing Sheets

METHOD AND APPARATUS FOR COMPENSATING FOR TEMPERATURE VARIATIONS OF A LIQUID CRYSTAL DISPLAY PANEL FOR A 3-DIMENSIONAL DISPLAY

CROSS-REFERENCE TO RELATED PATENT APPLICATION

This application claims priority from Korean Patent Application No. 10-2009-0101736, filed on Oct. 26, 2009, in the Korean Intellectual Property Office, the disclosure of which is incorporated herein in its entirety by reference.

BACKGROUND

1. Field

Apparatuses and methods consistent with described embodiments relate generally to driving a liquid crystal display (LCD) panel.

2. Description of the Related Art

A temperature of a liquid crystal display (LCD) panel is determined according to a temperature of a light source of a backlight unit, and a temperature of a set including a power board, an image board, and a timing controller. The temperature of the LCD panel continuously changes over a predetermined time after the LCD panel has been operated, and while the temperature of the LCD panel changes, a liquid crystal response speed of the LCD panel may continuously change. In other words, when the performance of a 3-dimensional (3D) display is compared at the point when the LCD panel set starts to operate and at the point when an initial temperature is saturated, the 3D display performance may be different while the temperature of the LCD panel changes.

SUMMARY

One or more exemplary embodiments provide a method and apparatus for compensating for a temperature of a liquid crystal display (LCD) panel, so as to drive the LCD panel while considering the temperature of the LCD panel.

According to an exemplary embodiment, there is provided a method of compensating for a temperature of an LCD panel, the method including: detecting the temperature of the LCD panel; selecting a lookup table from among lookup tables for 3-dimensional (3D) display of the LCD panel, the lookup table corresponding to the detected temperature; and adjusting luminance to be output to the LCD panel based on the selected lookup table.

In another exemplary embodiment, the method further comprises applying a voltage to each pixel of the LCD panel corresponding to the adjusted luminance.

In another exemplary embodiment, the method further comprises selecting a gamma value from among gamma values according to each temperature for the 3D display, the gamma value corresponding to the detected temperature, wherein adjusting the luminance may include adjusting the luminance based on the selected gamma value.

In a further exemplary embodiment, the lookup tables for the 3D display may include temperature compensating lookup tables corresponding to each temperature, wherein the temperature compensating lookup tables may be set according to a temperature section having a predetermined temperature range for the 3D display.

In another exemplary embodiment, the lookup tables for the 3D display may include information about an input luminance, a target luminance, and a virtual luminance, the virtual luminance corresponding to the input luminance and the target luminance. Each of the temperature compensating lookup tables may include information about the input luminance, the target luminance, and the virtual luminance, the virtual luminance corresponding to the input luminance and the target luminance.

In an additional exemplary embodiment, in adjusting the luminance, when a current frame and a following frame are sequentially displayed on the LCD panel, luminance of the current frame may be the input luminance, luminance of the following frame may be the target luminance, and the virtual luminance for changing the input luminance to the target luminance may be selected as the luminance to be output to the LCD panel based on the selected lookup table.

In another exemplary embodiment, the lookup tables for the 3D display may be set according to the luminance or an applied voltage corresponding to the luminance.

In a further exemplary embodiment, the gamma values according to each temperature may be set according to a temperature section having a predetermined range.

According to another exemplary embodiment, there is provided an apparatus for compensating for a temperature of a liquid crystal display (LCD) panel, the apparatus including: an LCD panel temperature detector for detecting the temperature of the LCD panel; a lookup table selector for selecting a lookup table, from among lookup tables for a 3-dimensional (3D) display of the LCD panel, the lookup table corresponding to the temperature of the LCD panel; and a temperature compensator for adjusting a luminance to be output to the LCD panel by using the lookup table.

In another exemplary embodiment, the apparatus may further include an LCD driving voltage applier for applying a voltage to each pixel of the LCD panel corresponding to the luminance adjusted by the temperature compensator.

In an additional exemplary embodiment, the apparatus may further include a gamma value selector for selecting a gamma value corresponding to the temperature detected by the LCD panel temperature detector from among gamma values, wherein the temperature compensator may adjust the luminance to be output to the LCD panel by using the lookup table and the gamma value.

In a further exemplary embodiment, in the temperature compensator, when a current frame and a following frame are sequentially displayed on the LCD panel, luminance of the current frame may be the input luminance, luminance of the following frame may be the target luminance, and the virtual luminance for changing the input luminance to the target luminance may be selected as the luminance to be output to the LCD panel based on the selected lookup table.

In another exemplary embodiment, the apparatus may select one of a 2-dimensional (2D) display mode and a 3D display mode, and, when the 2D display mode is selected, the lookup table selector may select a lookup table for a 2D display from among lookup tables for a 2D display and a 3D display.

In yet another exemplary embodiment, the apparatus may select one of a 2D display mode and a 3D display mode, and, when the 2D display mode is selected, the gamma value selector may select a gamma value for a 2D display from among gamma values for a 2D display and a 3D display.

According to another exemplary embodiment, there is provided a computer program product for compensating for a temperature of a liquid crystal display (LCD) panel, the computer program product embodied on a computer readable medium and when executed by a computer, performs the method comprising selecting a lookup table corresponding to a detected temperature of the LCD panel for a 3-dimensional (3D) display of the LCD panel; and adjusting a luminance to be output to the LCD panel based on the selected lookup table.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION

Hereinafter, the exemplary embodiments will be described more fully with reference to the accompanying drawings, in which the exemplary embodiments of the invention are shown.

Figure 1:
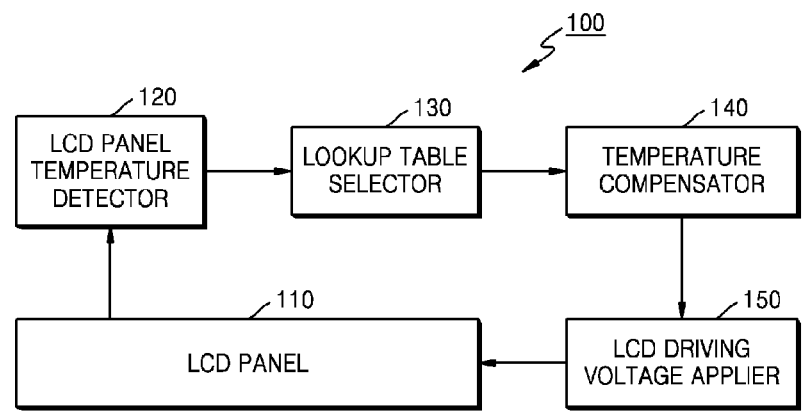
FIG. 1 is a block diagram of an apparatus for compensating for a temperature of a liquid crystal display (LCD) panel, according to an exemplary embodiment.

FIG. 1 is a block diagram of an apparatus 100 for compensating for a temperature of a liquid crystal display (LCD) panel 110, according to an exemplary embodiment.

The apparatus 100 includes an LCD panel 110, an LCD panel temperature detector 120, a lookup table selector 130, a temperature compensator 140, and an LCD driving voltage applier 150.

The LCD panel temperature detector 120 detects a temperature of the LCD panel 110. The LCD panel temperature detector 120 may directly measure the temperature of the LCD panel 110 or may detect the temperature by obtaining information about the temperature from a temperature measuring device (not shown).

The temperature of the LCD panel 110 continuously changes for a predetermined time after the LCD panel 110 starts to operate, and while the temperature of the LCD panel 110 changes, a liquid crystal response speed of the LCD panel 110 may continuously change. The liquid crystal response speed is slow during an initial state of the LCD panel 110, and decreases as the temperature of the LCD panel 110 increases up to a saturation temperature. Accordingly, a method for adjusting the liquid crystal response speed based on the temperature of the LCD panel 110 detected by the LCD panel temperature detector 120 will now be described.

The lookup table selector 130 selects a lookup table from among lookup tables for a 3-dimensional (3D) display of the LCD panel 110, with the selected lookup table corresponding to the temperature detected by the LCD panel temperature detector 120. The lookup table selector 130 may include a lookup table storage unit (not shown) for storing the lookup tables for the 3D display.

In one exemplary embodiment, the lookup tables may each include information about an input luminance, a target luminance, and a virtual luminance, where the virtual luminance corresponds to the input luminance and the target luminance. In one exemplary embodiment, information about luminance may be set according to the luminance or an applied voltage corresponding to the luminance.

In an additional exemplary embodiment, the lookup tables may be temperature compensating lookup tables providing a compensation according to each temperature. The temperature compensating lookup tables may be set according to a temperature section having a predetermined range for a 3D display, in order to compensate for the temperature of the LCD panel 110. Each of the temperature compensating lookup tables may include information about virtual luminance, which corresponds to input luminance and target luminance at the temperature of the LCD panel 110.

The temperature compensator 140 adjusts a level of luminance to be output to the LCD panel 110 by using the lookup table selected by the lookup table selector 130. When a current frame and a following frame are sequentially displayed on the LCD panel 110, luminance of the current frame is the input luminance and luminance of the following frame is the target luminance. Accordingly, the temperature compensator 140 may select the virtual luminance for changing the luminance of the current frame to the luminance of the following frame as the luminance to be output to the LCD panel 110 based on the selected lookup table.

The LCD driving voltage applier 150 applies a voltage to the LCD panel 110 according to each pixel, with the voltage corresponding to the luminance adjusted by the temperature compensator 140. The voltage corresponding to the adjusted luminance may be over-driven or under-driven compared to a voltage corresponding to the target luminance.

The LCD panel 110 may selectively realize a 2-dimensional (2D) display and a 3D display. Here, the apparatus 100 may select one of a 2D display mode and a 3D display mode of the LCD panel 110, and when the 2D display mode is selected, the lookup table selector 130 may select a lookup table for a 2D display instead of a lookup table for a 3D display.

The apparatus 100 may operate the LCD panel 110 while considering the temperature of the LCD panel 110, since the voltage applied to each pixel of the LCD panel 110 is determined based on the temperature compensating lookup tables selected according to each temperature of the LCD panel 110. Also, a driving voltage of the LCD panel 110 is over-driven or under-driven according to the temperature of the LCD panel 110, and thus the apparatus and method permits the liquid crystal response speed that changes according to temperature to be adjusted as much as possible.

Figure 2:
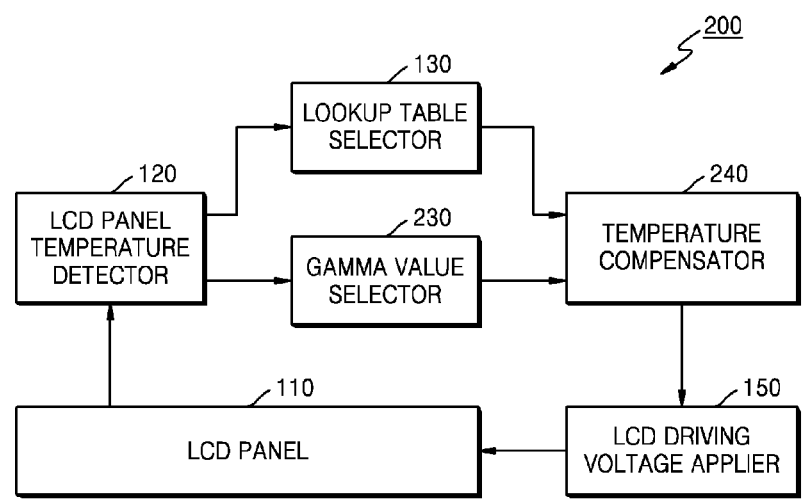
FIG. 2 is a block diagram of an apparatus for compensating for a temperature of an LCD panel, according to another exemplary embodiment.

FIG. 2 is a block diagram of an apparatus 200 for compensating for a temperature of the LCD panel 110, according to another exemplary embodiment.

The apparatus 200 according to the current exemplary embodiment includes the LCD panel 110, the LCD panel temperature detector 120, the lookup table selector 130, a gamma value selector 230, a temperature compensator 240, and the LCD driving voltage applier 150. The apparatus 200 not only includes the lookup table selector 130 but also the gamma value selector 230. In this exemplary embodiment, the temperature compensator 240 adjusts the liquid crystal response speed based not only on the lookup table but also on a gamma value selected by the gamma value selector 230.

The gamma value selector 230 selects a gamma value from among gamma values according to each temperature for the 3D display of the LCD panel 110.

A tone reproduction curve showing an increasing rate of luminance according to an increase of an input signal value of an image has a non-linear characteristic, in which luminance exponentially increases according to a linearly increasing input signal value. Here, a square value of an exponential function of luminance with respect to an input signal value is defined to be a gamma value, and a gamma value of a general cathode ray tube (CRT) monitor is from about 2.2 to about 2.5. Since output amounts of light with respect to an applied voltage generated according to an input signal value are different in the LCD panel 110 and the CRT monitor, gamma correction is performed so as to make the output amounts of light the same. By performing the gamma correction, a gray scale in a center area is classified to be narrow and a gray scale in a bright or dark area is classified to be wide, and thus a gray scale is delicately displayed and an image is smoothly displayed.

The apparatus 200 may variably select a gamma value according to temperature, considering that the liquid crystal response speed is variable according to the temperature of the LCD panel 110. Accordingly, the gamma value selector 230 may store gamma values according to each temperature, and may select a gamma value from among the stored gamma values that corresponds to the temperature of the LCD panel 110 detected by the LCD panel temperature detector 120. Each of the gamma values corresponding to each temperature may be set according to a temperature section having a predetermined range.

The temperature compensator 240 adjusts the luminance to be output to the LCD panel 110 by using the lookup table selected by the lookup table selector 130 and the gamma value selected by the gamma value selector 230.

The LCD driving voltage applier 150 applies a voltage to each pixel of the LCD panel 110 according to the luminance adjusted based on the temperature of the LCD panel 110. The voltage according to the adjusted luminance may be over-driven or under-driven compared to a voltage at the target luminance.

The apparatus 200 may select one of the 2D display mode and the 3D display mode of the LCD panel 110, and when the 2D display mode is selected, the gamma value selector 230 may select a gamma value for a 2D display instead of a gamma value for a 3D display.

The apparatus 200 may operate the LCD panel 110 while precisely considering the temperature of the LCD panel 110, since the voltage applied to each pixel of the LCD panel 110 is determined based not only on the temperature compensating lookup tables, but also on the gamma value according to each temperature.

Figure 3:
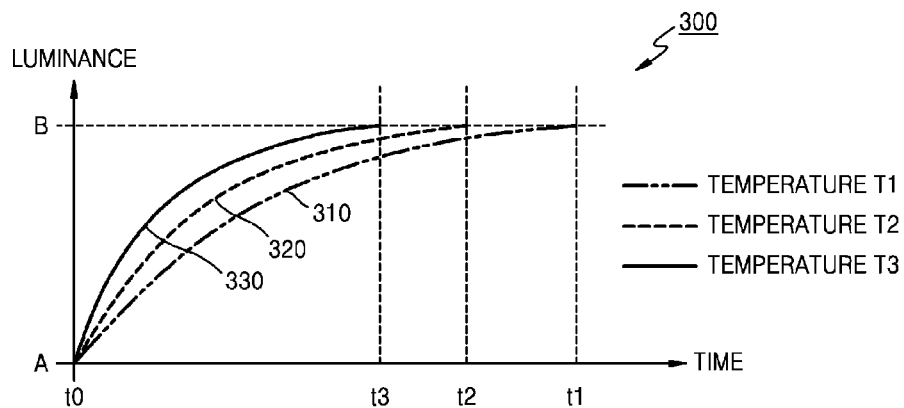
FIG. 3 is a graph showing liquid crystal response curves of an LCD panel according to a temperature.

FIG. 3 is a graph showing liquid crystal response curves 310, 320, and 330 of an LCD panel according to a temperature.

A liquid crystal response graph 300 of an LCD panel illustrated in FIG. 3 shows a changing rate of luminance according to time. The temperature of the LCD panel gradually increases from when a voltage is applied to the LCD panel until it reaches a saturation temperature. When the voltage is applied, an initial temperature of the LCD panel increases in an order of temperature T1, temperature T2, and temperature T3, with T1 being the lowest temperature and T3 being the highest temperature. The temperature T3 is assumed to be the saturation temperature of the LCD panel.

Liquid crystal response speeds at the temperatures T1 through T3 will now be described while input luminance A changes to target luminance B. Looking at points of time when the input luminance A changes to the target luminance B from a point t0 of time when the voltage is applied to the LCD panel, the liquid crystal response curve 310 at temperature T1 reaches the target luminance B at a time t1, the liquid crystal response curve 320 at temperature T2 reaches the target luminance B at a time t2, and the liquid crystal response curve 330 at the temperature T3 reaches the target luminance B at a time t3. In other words, the target luminance B is reached in the greatest amount of time at temperature T1, which is the lowest temperature from among the temperatures T1, T2, and T3; and the target luminance B is reached in the least amount of time at temperature T3, which is the highest temperature and also the saturation temperature.

Accordingly, when the liquid crystal response curves 310, 320, and 330 are compared at the same point of time, for example at time t3, the luminance of the liquid crystal response curve 330 at the temperature T3 is the highest, the luminance of the liquid crystal response curve 320 at the temperature T2 is in the middle, and the luminance of the liquid crystal response curve 310 at the temperature T1 is the lowest. Consequently, it is determined that the liquid crystal response speed is slow when the temperature is low, and fast when the temperature is high.

Figure 4:
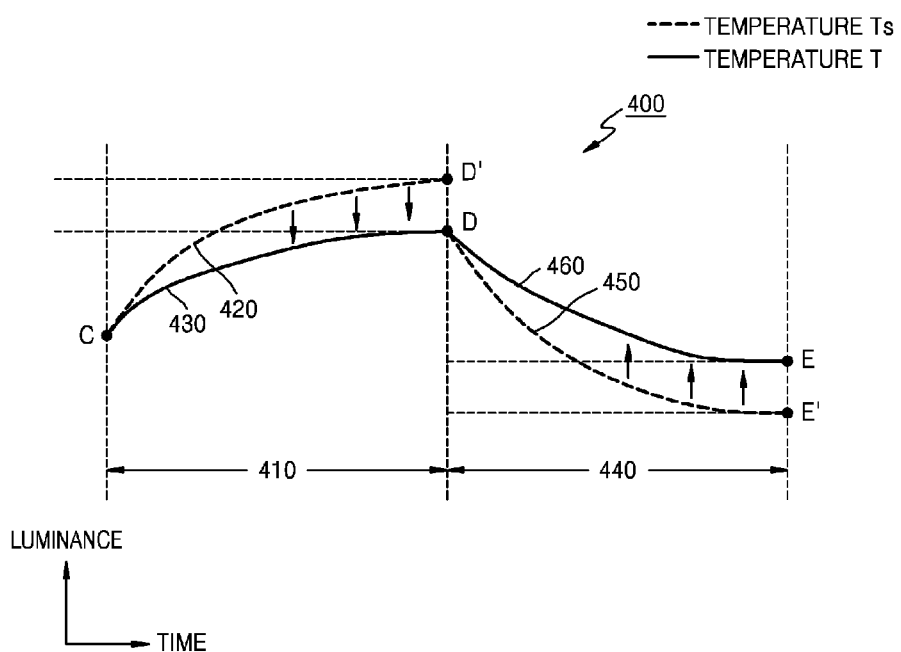
FIG. 4 is a graph showing virtual luminance according to input luminance, target luminance, and a temperature of an LCD panel, according to an exemplary embodiment.

FIG. 4 is a graph showing virtual luminance according to input luminance, target luminance, and a temperature of an LCD panel, according to an exemplary embodiment.

The graph 400 shows liquid crystal response curves 430 and 460 of the LCD panel at a temperature T below a saturation temperature Ts. In a section 410, a liquid crystal response curve 420 shows luminance changing from an input luminance C to luminance D' at the saturation temperature Ts.

A liquid crystal response speed of the LCD panel at the temperature T is slower than that of the LCD panel at the saturation temperature Ts, and thus even when a voltage corresponding to the luminance D' is applied to the LCD panel at the temperature T in section 410, the liquid crystal response curve 420 is not generated. Instead, the liquid crystal response curve 430 is generated, in which the luminance increases from the luminance C to luminance D, wherein D<D'.

By using such liquid crystal response characteristics according to a temperature of the LCD panel, the apparatus 100 or 200 according to the exemplary embodiments may apply a voltage corresponding to virtual luminance to the LCD panel, instead of a voltage corresponding to target luminance. For example, the apparatus 100 or 200 may apply a voltage corresponding to the luminance D' as a virtual luminance, which is higher than a voltage corresponding to the luminance D as a target luminance, in order to increase the luminance of the LCD panel from the luminance C to the luminance D.

Here, the luminance D' may be determined through experiments, so as to obtain the liquid crystal response curve 430, in which the luminance of the LCD panel increases from the luminance C to the luminance D, as the voltage corresponding to the luminance D' is applied to the LCD panel at the temperature T.

Also, in a section 440, a liquid crystal response curve 450 shows luminance changing from an input luminance D to luminance E' at the saturation temperature Ts.

In section 440, the liquid crystal response curve 450 is not generated even when a voltage corresponding to the luminance E' is applied to the LCD panel at the temperature T. Instead, the liquid crystal response curve 460, in which the luminance decreases from the input luminance D to luminance E, may be generated.

By using such liquid crystal response characteristics of the LCD panel according to each temperature, the apparatus 100 or 200 may apply a voltage corresponding to the luminance E' as a virtual luminance, which is lower than a voltage corresponding to the luminance E as a target luminance, to the LCD panel in order to decrease the luminance from the luminance D as input luminance to the luminance E.

Here, the luminance E' may be determined through experiments, so as to obtain the liquid crystal response curve 460, in which the luminance of the LCD panel decreases from the luminance D to the luminance E, as the voltage corresponding to the luminance E' is applied to the LCD panel at the temperature T.

Figures 5, 6:
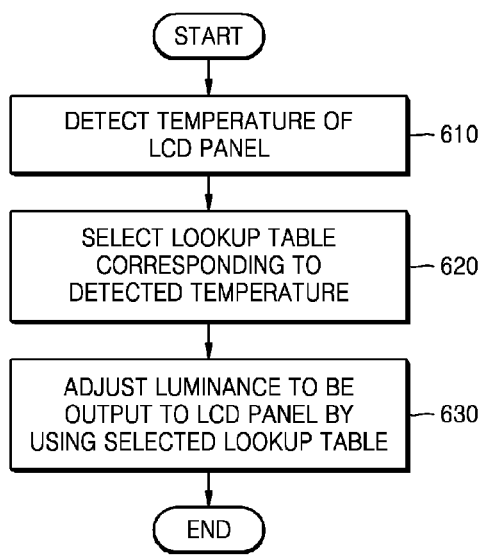
FIG. 5 is a temperature compensating lookup table, according to an exemplary embodiment.
FIG. 6 is a flowchart illustrating a method of compensating for a temperature of an LCD panel, according to an exemplary embodiment.

FIG. 5 is a temperature compensating lookup table 500, according to an exemplary embodiment.

The temperature compensating lookup table 500 contains information on determining a virtual luminance 530 from an input luminance 510 and a target luminance 520. The virtual luminance is then used for changing the input luminance to the target luminance at a predetermined temperature of an LCD panel. For example, in the temperature compensating lookup table 500, when the input luminance 510 is 10 and the target luminance 520 is 100, the virtual luminance 530 is F, and when the input luminance 510 is 200 and the target luminance 520 is 50, the virtual luminance 530 is G.

When the temperature compensator 140 or 240 (see FIGS. 1 and 2) determines a voltage to be applied to the LCD panel that has not yet reached a saturation temperature based on the temperature compensating lookup table 500, the virtual luminance 530 of F may be determined to be larger than 100 in order to increase the input luminance 510 value of 10 to the target luminance 520 value of 100. On the other hand, the virtual luminance 530 of G may be determined to be lower than 50 in order to decrease the input luminance 510 value of 200 to the target luminance 520 value of 50.

The temperature compensating lookup table 500 may be set according to each temperature. For example, the temperature compensating lookup table 500 may be for an LCD panel at a temperature in the range of approximately 20 degrees Celsius (° C.) to about 30° C. Accordingly, when the temperature of the LCD panel is 26° C., the temperature compensator 140 or 240 may refer to the temperature compensating lookup table 500.

Alternately, the temperature compensating lookup table 500 may be set according to a temperature section having a predetermined temperature range for a 3D display. For example, the temperature compensating lookup table 500 may be set when the temperature of the LCD panel is from about 10° C. to 20° C., when the temperature of the LCD panel is from about 21° C. to 30° C., and when the temperature of the LCD panel is from about 31° C. to 40° C. Accordingly, virtual luminance optimized to an actual temperature may be determined by referring to temperature compensating lookup tables 500 according to each temperature.

The temperature compensating lookup table 500 of FIG. 5 shows cases only when the input luminance 510 and the target luminance 520 have values of 0, 10, 50, 100, 200, and 255, and the temperature compensating lookup table 500 is a simple lookup table for convenience of description. Accordingly, embodiments of a lookup table for the apparatuses 100 and 200 are not limited to the temperature compensating lookup table 500.

FIG. 6 is a flowchart illustrating a method of compensating for a temperature of an LCD panel, according to an exemplary embodiment.

In operation 610, the temperature of the LCD panel is detected. When the temperature has not yet reached a saturation temperature, a liquid crystal response speed of the LCD panel may be slow. Accordingly, the method according to the current exemplary embodiment adjusts the liquid crystal response speed of the LCD panel according to the detected temperature of the LCD panel.

In operation 620, a lookup table corresponding to the detected temperature is selected from among lookup tables for a 3D display of the LCD panel. The lookup tables for the 3D display may include information about luminance or an applied voltage corresponding to the luminance. Examples of a lookup table include a lookup table for a 3D display, a temperature compensating lookup table set according to each temperature for a 3D display, and a lookup table for a 2D display.

In operation 630, luminance to be output to the LCD panel is adjusted by using the selected lookup table. A voltage corresponding to virtual luminance applied to the LCD panel that has not yet reached the saturation temperature may be larger than a voltage corresponding to target luminance, in order to increase the luminance from the input luminance to the target luminance. Alternatively, a voltage smaller than the voltage corresponding to the target luminance may be applied to the LCD panel that has not yet reached the saturation temperature, in order to decrease the luminance from the input luminance to the target luminance.

Figure 7:
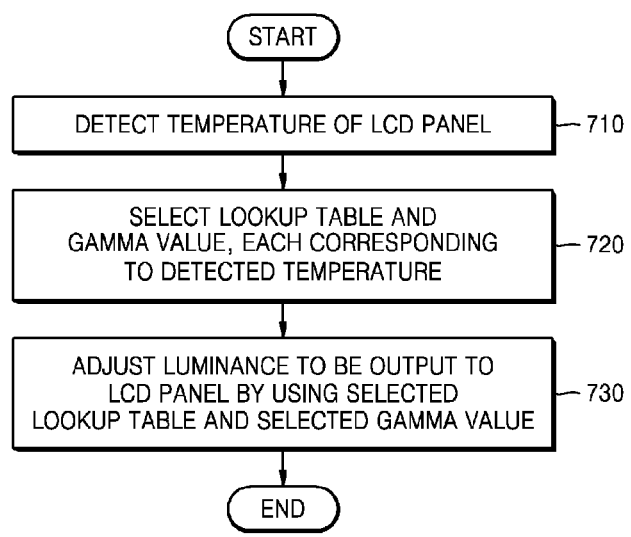
FIG. 7 is a flowchart illustrating a method of compensating for a temperature of an LCD panel, according to another exemplary embodiment.

FIG. 7 is a flowchart illustrating a method of compensating for a temperature of an LCD panel, according to another exemplary embodiment.

The temperature of the LCD panel is detected in operation 710, and a lookup table and a gamma value, each corresponding to the detected temperature of the LCD panel, are respectively selected in operation 720. The lookup table and gamma value are respectively selected from among lookup tables for a 3D display of the LCD panel and gamma values according to each temperature for the 3D display of the LCD panel. In operation 730, luminance to be output to the LCD panel is adjusted based on the selected lookup table and the selected gamma value.

Even if a voltage corresponding to a target luminance is applied to an LCD panel, 3D display performance of the LCD panel may deteriorate when a liquid crystal response is delayed because a temperature of the LCD panel has not yet reached a saturation temperature. Accordingly, the methods according to the exemplary embodiments minimize a difference in 3D display performance according to temperature by adjusting a liquid crystal response speed based on the temperature of the LCD panel by using temperature compensating lookup tables set according to each LCD panel temperature. In addition, a gamma value is selected according to the temperature of the LCD panel, and thus a 3D display effect of the LCD panel may be increased.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While the inventive aspects have been particularly shown and described with reference to exemplary embodiments thereof, it will be understood by those of ordinary skill in the art that various changes in form and details may be made therein without departing from the spirit and scope of the inventive aspects as defined by the following claims.

What is claimed is:

1. A method of compensating for a temperature of a liquid crystal display (LCD) panel, the method comprising:

selecting a lookup table corresponding to a directly detected temperature of the LCD panel from among a plurality of lookup tables comprising first lookup tables for a two-dimensional (2D) display and second lookup tables for a 3-dimensional (3D) display of the LCD panel; and selecting a gamma value according to the detected temperature of the LCD panel; and adjusting a luminance to be output to the LCD panel based on the selected lookup table and the selected gamma value, wherein the first lookup tables comprise a temperature compensating lookup table set according to each temperature for the 2D display and the second lookup tables comprises a temperature compensating lookup table set according to each temperature for the 3D display.

2. The method of claim 1, further comprising directly detecting the temperature of the LCD panel by measuring the temperature of the LCD panel.

3. The method of claim 1, further comprising applying a voltage to each pixel of the LCD panel based on the adjusted luminance.

4. The method of claim 1, wherein the temperature compensating lookup table for the 2D display or the 3D display is set according to a temperature section having a predetermined temperature range for the 2D display or the 3D display.

5. The method of claim 4, wherein the temperature compensating lookup table for the 2D display or the 3D display comprises information about an input luminance, a target luminance, and a virtual luminance, the virtual luminance corresponding to the input luminance and the target luminance, for the 2D display or the 3D display.

6. The method of claim 1, wherein the second lookup tables for the 3D display comprise information about an input luminance, a target luminance, and a virtual luminance, with the virtual luminance corresponding to the input luminance and the target luminance.

7. The method of claim 6, wherein, in the adjusting the luminance, when a current frame and a following frame are sequentially displayed on the LCD panel, luminance of the current frame is the input luminance, luminance of the following frame is the target luminance, and the virtual luminance for changing the input luminance to the target luminance is selected as the luminance to be output to the LCD panel based on the selected lookup table.

8. The method of claim 1, wherein the second lookup tables for the 3D display are set according to the luminance or an applied voltage corresponding to the luminance.

9. The method of claim 1, wherein the gamma values corresponding to each temperature are set according to a temperature section having a predetermined temperature range.

10. The method of claim 1, wherein the selecting the gamma value comprises selecting a gamma value for the 2D display or a gamma value for the 3D display according to whether the LCD panel is operated in a 2D or 3D mode.

11. An apparatus for compensating for a temperature of a liquid crystal display (LCD) panel, the apparatus comprising:
a lookup table selector which selects a lookup table corresponding to a directly detected temperature of the LCD panel from among a plurality of lookup tables comprising first lookup tables for a two-dimensional (2D) display and second lookup tables for a 3-dimensional (3D) display of the LCD panel; and
a gamma value selector configured to select a gamma value according to the detected temperature of the LCD panel; and a temperature compensator configured to adjust a luminance to be output to the LCD panel based on the lookup table selected by the lookup table selector and the selected gamma value, wherein the first lookup tables comprise a temperature compensating lookup table set according to each temperature for the 2D display and the second lookup tables comprises a temperature compensating lookup table set according to each temperature for the 3D display.

12. The apparatus of claim 11, further comprising an LCD panel temperature detector which directly detects the temperature of the LCD panel by measuring the temperature of the LCD panel.

13. The apparatus of claim 11, further comprising an LCD driving voltage applier applying a voltage to each pixel of the LCD panel, where the applied voltage corresponds to the luminance adjusted by the temperature compensator.

14. The apparatus of claim 11, wherein the temperature compensating lookup table for the 2D display or the 3D display is set according to a temperature section having a predetermined temperature range for the 2D display or the 3D display.

15. The apparatus of claim 14, wherein the temperature compensating lookup table for the 2D display or the 3D display comprises information about an input luminance, a target luminance, and a virtual luminance, the virtual luminance corresponding to the input luminance and the target luminance, for the 2D display or the 3D display.

16. The apparatus of claim 11, wherein the second lookup tables for the 3D display comprise information about an input luminance, a target luminance, and a virtual luminance, the virtual luminance corresponding to the input luminance and the target luminance.

17. The apparatus of claim 16, wherein, in the temperature compensator, when a current frame and a following frame are sequentially displayed on the LCD panel, luminance of the current frame is the input luminance, luminance of the following frame is the target luminance, and the virtual luminance for changing the input luminance to the target luminance is selected as the luminance to be output to the LCD panel based on the selected lookup table.

18. The apparatus of claim 11, wherein the second lookup tables for the 3D display are set according to the luminance or an applied voltage corresponding to the luminance.

19. The apparatus of claim 11, wherein the gamma values corresponding to each temperature are set according to a temperature section having a predetermined temperature range.

20. A computer program product for compensating for a temperature of a liquid crystal display (LCD) panel, the computer program product embodied on a non-transitory computer readable medium and when executed by a computer, performs the method comprising:
selecting a lookup table corresponding to a directly detected temperature of the LCD panel from among a plurality of lookup tables comprising first lookup tables for a two-dimensional (2D) display and second lookup tables for a 3-dimensional (3D) display of the LCD panel; and
a gamma value selector configured to select a gamma value according to the detected temperature of the LCD panel; and adjusting a luminance to be output to the LCD panel based on the selected lookup table and the selected gamma value, wherein the first lookup tables comprise a temperature compensating lookup table set according to each temperature for the 2D display and the second lookup tables comprises a temperature compensating lookup table set according to each temperature for the 3D display.

* * * * *